No. 630,728. Patented Aug. 8, 1899.
J. N. McINTIRE & S. L. HOLDEN.
BOWLING ALLEY.
(Application filed Mar. 27, 1899.)
(No Model.) 2 Sheets—Sheet 1.
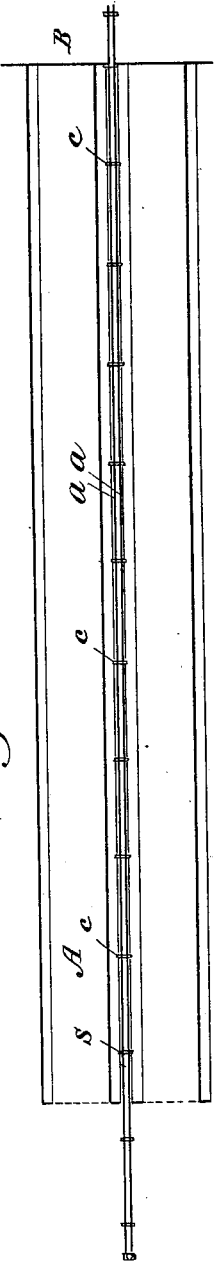
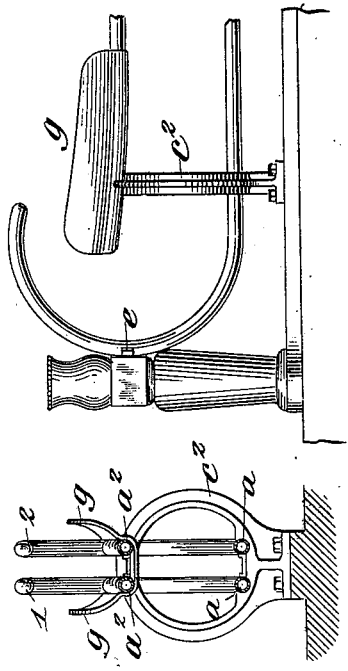
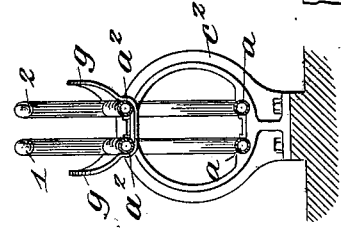
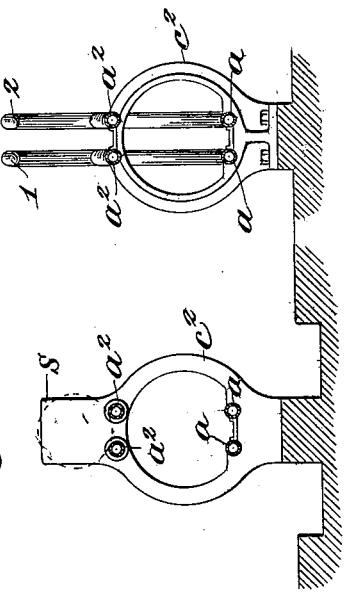
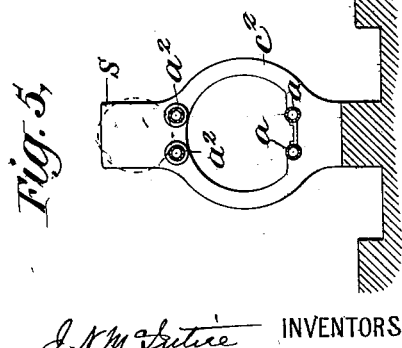
WITNESSES:
D. N. Hayword
J. C. Olsen
INVENTORS
J. N. McIntire
and S. L. Holden.
BY
J. N. McIntire
ATTORNEY
THE NORRIS PETERS CO., PHOTO-LITHO., WASHINGTON, D. C.

No. 630,728. Patented Aug. 8, 1899.
J. N. McINTIRE & S. L. HOLDEN.
BOWLING ALLEY.
(Application filed Mar. 27, 1899.)
(No Model.) 2 Sheets—Sheet 2.
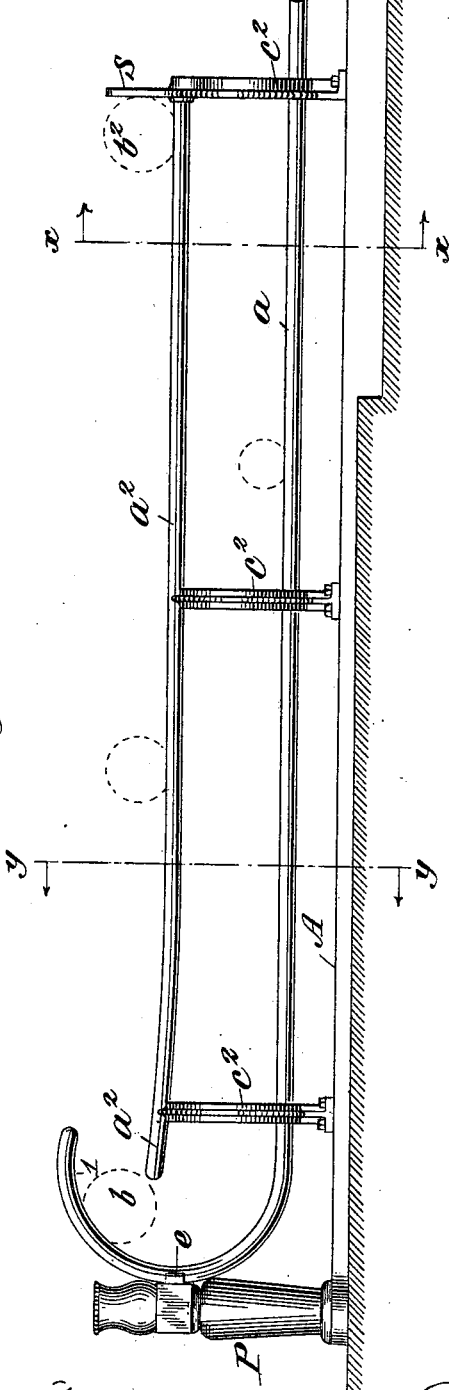
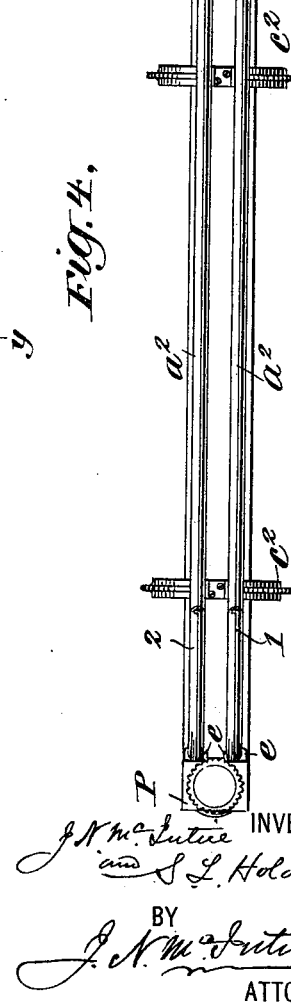
WITNESSES:
INVENTORS
BY
ATTORNEY
THE NORRIS PETERS CO., PHOTO-LITHO., WASHINGTON, D. C.

United States Patent Office.

JACOB N. McINTIRE AND SYLVANUS L. HOLDEN, OF NEW YORK, N. Y., ASSIGNORS, BY DIRECT AND MESNE ASSIGNMENTS, TO SIGNE C. OLSEN, OF SAME PLACE.

BOWLING-ALLEY.

SPECIFICATION forming part of Letters Patent No. 630,728, dated August 8, 1899.

Application filed March 27, 1899. Serial No. 710,560. (No model.)

*To all whom it may concern:*

Be it known that we, JACOB N. MCINTIRE, residing at New York city, borough of Manhattan, in the county of New York, and SYL-VANUS L. HOLDEN, residing at Brooklyn borough, in the city of New York, in the State of New York, citizens of the United States, have invented certain new and useful Improvements in Bowling-Alleys, of which the following is a specification.

Our invention relates particularly to what is generally designated the "ball-return way" of a bowling-alley, and has for its main objects to effectuate the return of the balls from the pit end to the players' end of the alley in such manner that the returned balls will be delivered initially onto the rearmost portion of the terminal on which the balls are returned for use by the players instead of coming onto the said terminal at its forward end, as heretofore, and to also effectuate the return of the balls onto the said terminal at a minimum rate of speed, so that in landing thereon and coming to rest thereupon the home-coming balls will not contact with injurious force.

To these main ends and objects our invention may be said to consist, primarily, in a return-way or means for the transportation of the balls from the pit end to the players' end of the alley which effectuates the landing of the balls successively on the terminal or rest, from which they are taken to bowl with, at the rearmost end or portion of said terminal or ball-receptacle, and, secondly, in a return-way composed of suitable ways (on which the balls roll) that descend from a suitable elevation at the pit end of the alley and run thence along toward the players' end, that pass along rearwardly beneath the ball terminal or receptacle, that are curved upwardly in rear of said terminal, and that operate to deliver the balls onto said terminal at its rear end or portion, all as will be hereinafter more fully described and as will be most particularly pointed out or defined in the claims of this specification.

To enable those skilled in the art of building bowling-alleys and familiar with the use of the same to make and use alleys provided with our improved ball-return way, we will now proceed to more fully explain the construction and operation of the latter, referring by letters and figures to the accompanying drawings, which form part of this specification and in which we have shown our invention carried out in that precise form in which we have so far practiced the same, though of course various modifications may be made without departing from our invention so long as the novel principle of construction and mode of operation peculiar thereto be followed, (either with reference to the main or the secondary part of our said invention,) although only one part of our invention may be used with advantage, though we deem it preferable and more advantageous to use at once all the novel features of our said improvement.

In the drawings, Figure 1 is a side elevation of a bowling-alley ball-return way made according to our invention. Fig. 2 is a top view of the same. Fig. 3 is a side view of only so much of the contrivance extending from the extreme rear end of the alley forwardly as comprises the ball-terminal and the rearmost portion of the track on which the balls travel and by which they are successively delivered onto the said terminal, the scale being considerably increased, so as to better show the details of construction. Fig. 4 is a top view (on the same scale) of what is shown in elevation at Fig. 3. Fig. 5 is a vertical cross-section at the line $x\,x$ of Fig. 3 looking in the direction there indicated by the half-arrow. Fig. 6 is a vertical section at the line $y\,y$ of Fig. 3 looking in the direction indicated by the arrow. Figs. 7 and 8 are views showing a modification of the receiving rear end of the terminal.

In several of the figures we have illustrated by dotted circles tenpin-balls rolling along on the return-way and at rest on the terminal, and the same part in the various views will be found always designated by the same letter or figure of reference.

A represents the usual ballways or beds of a pair of bowling-alleys, at one end of which stand for play the bowlers, and at the other end of which are placed, as usual, the pins to be played at, and immediately in rear of which last-named end of each ballway is the pit B, all as well understood by those skilled in the art.

$a\ a$ are the ways of the return-way, which in the case shown are composed of metallic cylindrical tubes or piping, the two ways being arranged parallel with each other and a suitable distance apart to properly support and conduct all such tenpin-balls as may have to roll along on them and at the same time permit the balls of different sizes to travel at a desirable rate of speed thereon. The track or "ball-conductor," so to speak, thus formed, preferably, of these hollow ways $a\ a$ starts at the pit end of the alley at an elevation which will permit of the easy or convenient placement thereon (at said point) of the balls by the "pit-boy" or the attendant, who has to pick up out of the pit the balls which have been bowled and to be returned to the players' end of the alley for reuse, and from this rearmost and highest point the track extends obliquely downward and rearward, as best seen at Fig. 1, until, by preference, it reaches a level slightly above that of the ballway or bed of the alley, from which point it runs, by preference, horizontally rearward to a point almost as far back as the rearmost end of the terminal or ball-receptacle $a^2$ and almost back to the locality of the usual newel-post P, that is placed at the rear end of the alley. From the last-named point the track or return-way is curved upwardly, preferably, in an approximately circular arc equal to a little more than half a circumference and forwardly, so that the ends of its two ways $a\ a$ project forwardly beyond the rear ends of the two ways $a^2\ a^2$, that constitute the terminal or ball-receptacle, at an elevation somewhat above that of said terminal ways' rear ends and in about the same vertical planes, respectively, in which lie said rear ends of the terminal ways, all as clearly shown in the drawings. (See particularly Figs. 1, 3, and 4.)

The distance or space between the upper rear portions of the terminal ways $a^2\ a^2$ and the lowest surface of the overhanging end portions 1 2 of the return-ways $a\ a$ should be at least sufficient in the clear to permit the largest-sized ball that may be used on the alley to travel upwardly and forwardly in contact with the ways $a\ a$ without interference with the rear ends of the ways $a^2\ a^2$ of the terminal track or ball-receptacle, as most plainly illustrated at Fig. 3, where $b$ represents a ball of the largest size used in its passage along on that curved portion of the return-way just above alluded to and nearly arrived at the point in its course at which it will gravitate onto the rear end portions of the terminal ways $a^2\ a^2$, on which it will then roll along in the direction indicated by the arrow at said Fig. 3 until it arrives at the stop-post S or into the position shown at $b^2$.

Of course any smaller balls which may be used will, in traveling upwardly and forwardly in contact with the curved rear end portions of the ways $a\ a$ and thence descending onto the rear end portions of ways $a^2\ a^2$, have to drop or gravitate through a little greater space, respectively, according to their sizes, to get onto the terminal ways; but such smaller balls will, like the largest-sized ball, land all right on the rearmost portion of the terminal track and will roll thence forwardly thereon until stopped either by the stop device S or by coming into contact with some other ball previously delivered onto and stopped on the said terminal.

Properly proportioned and arranged as to its rearmost downwardly-inclined portion, its long level or horizontal part, and its rearmost upwardly and forwardly turned (or its approximately semicircular) portion, the track $a\ a$ will effectuate the return from the pit end of the alley onto the terminal or ball-rest $a^2\ a^2$ of any ball of the larger series—$i.\ e.$, any ball from the "regulation" size of twenty-seven inches in circumference down to and inclusive of, say, a ball five and a half inches in diameter—with sufficient rapidity to meet all the requirements of the bowler, (who frequently wants to use over the last-bowled ball the instant the pins may have been reset,) while at the same time the ball thus rapidly returned from the pit end to the player's end of the alley will be delivered onto the rearmost portion of the terminal instead of arriving at the forward end thereof, as is the case of all bowling-alleys made and used heretofore that we know of, and will land on said terminal at such a low rate of speed or travel that not only is all injurious forcible contact or concussion between a home-coming ball and either the stop-post of or other balls already assembled on the terminal wholly avoided, but, furthermore, the ball delivered onto the rear portion of said terminal may be conveniently picked up by the player before it shall even have rolled or traveled along on the terminal to the point at which it would be forced to come to a standstill.

The principle of construction and mode of action of our improved return-way carried into effect in the form shown and described are such that not only will a home-coming ball traveling at a rapid rate from the pit end to the players' end of the alley be effectually checked as it rolls up and around within the upwardly-curved rear end portion of the ways or track $a\ a$, but, furthermore, by reason of the ball $b$ (see Fig. 3) having, besides its bodily movement, a rotatory motion on a substantially horizontal axis (as it leaves the ways $a\ a$) in the opposite direction in which said ball must rotate (on such axis) in order to roll forward on the terminal ways $a^2\ a^2$ the result is that when the ball $b$ runs out of contact with ways $a\ a$ and gravitates immediately into contact with ways $a^2\ a^2$ its tendency, by reason of its said rotating movement, is to roll backward (instead of forward) on the terminal ways, and we have found by experiment and practice that where the parts of the return-way are proportioned and arranged to discharge the ball $b$ at an exceedingly low rate of travel (which is desirable) the tendency of the ball, on account of the rotatory motion it has, to roll backward on the terminal will just about counteract the forward bodily movement, and the ball will come to a dead stop at about the instant it contacts with the rear end portion of the terminal $a^2$ $a^2$. Therefore the ways $a^2$ $a^2$ are properly inclined downward, as shown, (see particularly Fig. 3,) from their rear ends toward the stop-post S, the degree and extent of the obliquity being such as to insure the rolling of any ball delivered onto the terminal, as illustrated at $b$, Fig. 3, forwardly on the said terminal until it comes into contact with either the post S (if the terminal be empty) or the rearmost one of any balls that may be already assembled on the terminal.

In the case shown, the ways of the ball-track being made, preferably, of hollow rods or metallic tubes $a$ $a$, we have provided metallic stands $c$ for the rigid support of said ways, these stands being bolted or otherwise securely fastened to the floor of the alley at their lower ends and having their upper bifurcated end portions secured to the tubular ways, all as clearly illustrated, though these details of construction may of course be varied in the judgment of the alley-builder, and in lieu of the tubular metallic ways $a$ $a$ others made of wood (as very commonly employed now) may be used, supported by some other means than the metallic stands we have shown.

If desirable to render the travel of the balls on the tubular ways $a$ $a$ as noiseless as possible, these tubes may be filled in with some suitable material to lessen the vibration of the metal and deaden the sound thereof.

The newel-post P, which usually has mounted on it the sponge-cup, may be made, as we have shown it, about as usual, and by preference we securely fasten the curved rear end portions of the ways $a$ $a$ to said post by metallic clips, as seen at $e$ (see Figs. 1 and 3) in the drawings.

The stop-post S, as well as the supporting-stands $c^2$ $c^2$, which sustain not only portions of the ways $a$ $a$, but also the terminal ways $a^2$ $a^2$, are so shaped or patterned, (see Figs. 5 and 6,) as shown, that their presence does not in the least interfere with the travel on the ways $a$ $a$ of the largest-sized ball used in the alleys, and the upper end of the stop S, where it projects above the ways $a^2$ $a^2$ and where the ball $b^2$ rests against it, may be provided, if found expedient, with a suitable rubber or other cushioning pad to render noiseless the contacting with the stop of the ball $b^2$, though in practice this may not be at all necessary, since if properly built the contrivance shown will operate so that the ball $b^2$ will come home against the stop S so slowly or with so little force as to render unnecessary the pressure of any cushioning device.

It will be seen that in a return-way such as herein shown and described the ways $a$ $a$, while being elevated at their rearmost ends, as usual, to a level, say, about three and a half feet above the alley-level in order to insure a sufficient impetus to the balls which roll down the descending portion of these ways to carry them to the players' end of the return-way and up through the curved rear end portion of the track, may be placed close down to the alley-floor—say at an elevation of from two to five inches above the floor—during nearly the whole length of the return-way, so that where there are a series of alleys with a return-way located between the ballways of each pair of alleys the ball-return ways do not in the least interfere with a full view of all the alleys and the playing thereon by spectators who sit on either side of the room to watch the games. This in many places is considered a great advantage, and it will be understood that in the use of our improved return-way the tracks or ways of the latter, unlike those of any other that we know of, are run close down to the floor clear back of and to a point some distance beyond the locality of the "balk-line" of the ballway, so that spectators located at either side of the bowling-alley room can see the delivery of a ball by a bowler (which has to be delivered without stepping beyond the balk-line) as he plays it onto the ballway of the alley.

In bowling-alleys as constituted prior to our invention the forward end of the terminal is almost universally located some three feet or more in advance of the balk-line of the alley-bed, and the player will often, in order to get the home-coming ball last used by himself, without any waiting, walk forward on the ballway, beyond the balk-line, to get the home-coming ball on the return-way at the instant it reaches the forward end of the terminal or ball-receptacle. This necessarily leads to a soiling of the surface of the ballway in advance of the balk-line and at the locality at which the balls in bowling are delivered onto the face of the alley, and this slight dirtying of the ballway is very objectionable, especially to the more expert bowlers, who require every part of the alley-bed to be in a clean and otherwise perfect condition in order to carry into effect their calculations in the delivery of a ball onto the alley and the precise manner in which it will roll thereon to produce a given desired effect. This serious difficulty or objection, inherent in most all alleys prior to our invention, we have wholly overcome by the employment of a return-way which delivers all the home-coming balls onto or at the rearmost end or portion of the terminal or ball-rest from which the player has to get his ball. He gets the last returned ball always at the back end or portion of the terminal and has never any occasion to walk over the balk-line for this purpose. Furthermore, by the delivery initially onto the rearmost end of the terminal the players can always receive for reuse the last return ball at the extreme rear end of the terminal (which is sometimes about fifteen feet in rear of the balk-line) without having to walk forward of the point at which they usually start to make the "run" preparatory to the delivery of the ball onto the ballway of the alley; but it will be understood that in so far as this primary feature of our invention is concerned some other means than the peculiar form of track we have shown may be employed to carry into effect the new idea and to produce the moral effect of landing the home-coming balls onto the rear end instead of at the forward end of the terminal, and that therefore we desire it to be understood that as to this part of our invention we do not desire to be restricted to the form of return-way shown and described. Neither do we wish to be understood as restricting ourselves in practicing the invention herein set forth to the combined use of this broad feature of novelty and the structural characteristic of a return-way the ball-track of which is made and operated as we have shown, since the primary part of our invention may be used alone with more or less advantages and with all the advantages that arise from the landing of the home-coming balls on the terminal in just the reverse manner to that always heretofore employed.

The sizes and proportions of the parts shown and described may of course be varied in the judgment of the experienced alley-builder, especially where the alley may not have the regulation full dimensions; but those we have shown in the drawings, Figs. 1 and 2 being drawn to a scale of about one-eighth of an inch to the foot, while Figs. 3, 4, 5, and 6 are drawn on a scale of three-quarters of an inch to the foot, will be found to produce good practical results in carrying our invention into effect.

At Figs. 7 and 8 we have shown a modification of the rear end portion of the terminal in which there are guards $g$ $g$ arranged at either side to meet the possible contingency of a ball jumping the track when landed on said terminal.

It is barely possible that sometimes, in the case of a home-coming ball of small size that may have some superficial imperfections, such ball may on striking the terminal ways $a^2$ $a^2$ unevenly run laterally off the track, and to guard against any such possibility it may be deemed expedient in some cases to apply some such preventive as the guards $g$ $g$, though we think it will seldom be necessary to resort to such precaution.

Having now so fully explained our invention that those skilled in the art to which it relates can make and use bowling-alleys embodying, either in whole or in part, our improvement in either the forms in which we have shown our invention carried out or under some modification of the latter, what we claim as new, and desire to secure by Letters Patent, is—

1. In a bowling-alley, the combination, with a terminal running lengthwise of the alley onto which the balls are successively returned from the pit end of the alley, as usual, of means for returning the balls automatically onto the rearmost end, or portion, of the said terminal; substantially as and for the purpose hereinbefore set forth.

2. In a bowling-alley, the combination, with the terminal, or ball-rest, of a return-way which has its pit end elevated sufficiently to cause a ball properly placed thereon, to roll toward and to the players' end of the return-way; and which has its other end curved upwardly and forwardly over the rear end of the said terminal, or ball-rest; so that, a ball, after having rolled from the pit end of the return-way to the said curved end, will roll up and around in said curved portion and pass therefrom onto the terminal; all substantially as and for the purposes hereinbefore set forth.

3. In a bowling-alley, the combination, with a return-way which inclines downwardly from its pit end toward the players' end and which has its other end turned, or curved, so that a ball rolled from the pit end will travel up in contact with the curved portion and pass therefrom, of a terminal, or ball-receptacle, onto which the ball passes, as specified; and which operates to effectuate a continuance of the rolling of the ball forwardly thereon, until it meets with a stop; all substantially as hereinbefore set forth.

In witness whereof we have hereunto set our hands this 15th day of March, 1899.

J. N. McINTIRE.
SYLVANUS L. HOLDEN.

In presence of—
R. W. DRUMMOND,
E. J. BUNKER.